United States Patent [19]

Hatakeyama et al.

[11] Patent Number: 4,996,068
[45] Date of Patent: Feb. 26, 1991

[54] METHODS FOR TREATING FOOD AND A DEOXODIZER PACKAGE IN A MICROWAVE OVEN

[75] Inventors: Hidetoshi Hatakeyama; Takashi Kashiba, both of Tokyo, Japan

[73] Assignee: Mitsubishi Gas Chemical Company, Japan

[21] Appl. No.: 278,363

[22] Filed: Nov. 30, 1988

[30] Foreign Application Priority Data

| Dec. 2, 1987 | [JP] | Japan | 62-303281 |
| Dec. 2, 1987 | [JP] | Japan | 62-303282 |
| Dec. 2, 1987 | [JP] | Japan | 62-303283 |

[51] Int. Cl.$^5$ .......... A23L 1/025; A23L 3/34; A23L 3/36; C09K 15/02
[52] U.S. Cl. .......... 426/234; 426/107; 426/124; 426/243; 426/324; 252/188.28
[58] Field of Search .......... 426/107, 124, 167, 234, 426/243, 324, 316; 252/188.28

[56] References Cited

U.S. PATENT DOCUMENTS

| 4,127,503 | 11/1978 | Yoshikawa et al. | 252/429 R |
| 4,166,807 | 9/1979 | Komatsu et al. | 252/439 |
| 4,192,773 | 3/1980 | Yoshikawa et al. | 252/429 R |
| 4,299,719 | 11/1986 | Aoki et al. | 252/188 |
| 4,421,235 | 12/1989 | Moriya | 202/524.2 |
| 4,485,133 | 11/1984 | Ohtsuka et al. | 428/35 |
| 4,657,610 | 4/1987 | Komatsu et al. | 156/87 |
| 4,762,722 | 8/1988 | Izumimoto et al. | 426/124 |

FOREIGN PATENT DOCUMENTS

| 0004073 | 9/1979 | European Pat. Off. |
| 0058204 | 8/1982 | European Pat. Off. |
| 0268848 | 6/1988 | European Pat. Off. |
| 60-17633 | 7/1979 | Japan | 252/188.28 |
| 58-138336 | 2/1982 | Japan |
| 63-082967 | 9/1986 | Japan |
| 63-87965 | 4/1988 | Japan |
| 63-233769 | 9/1988 | Japan |

*Primary Examiner*—Donald E. Czaja
*Assistant Examiner*—Evan Federman
*Attorney, Agent, or Firm*—Leydig, Voit & Mayer

[57] ABSTRACT

A deoxidizer package for use together with a food to be treated by a microwave irradiation comprises a deoxidation composition including iron poweder, a metal halide, and a powder filler having a small or no water-solubility and having a particle size of 60 mesh or finer and a specific surface area of 50 m$^2$/g or less, the powder filler being contained in of 100 volume parts or more for 100 volume parts of the iron powder. The deoxidizer package further has a gas permeable packaging material containing the deoxidation composition and having a gas permeability of 1,000 seconds/100 cc or less in terms of Gurley gas permeability. A food pack can be prepared in which the deoxidizer package is packed together with a food in a container made of a material having an oxygen permeability of 200 ml/m$^2$ 24 hr atm or less. By various methods making use of the deoxidizer package in combination with microwave irradiation, freeze-storing and thawing a food, storing a food and heat-cooking a food can be effectively performed.

6 Claims, No Drawings

METHODS FOR TREATING FOOD AND A DEOXODIZER PACKAGE IN A MICROWAVE OVEN

BACKGROUND OF THE INVENTION

1. Field of the Invention

The present invention relates to a deoxidizer package and a food pack in which a food is packed in a container together with a deoxidizer package. The invention also relates to a method of freeze-storing a food, as well as a method of thawing a freeze-stored food. The invention further relates to a method of storing a food and a method of cooking a stored food.

More particularly, the invention is concerned with a deoxidizer package for use together with a food which is to be thawed or cooked by irradiation with a microwave. The invention is also concerned with a food pack which has a deoxidizer package packed together with a food and which is to be treated by irradiation with a microwave. The invention is further concerned with a thawing or cooking method in which a food packed together with a deoxidizer agent and freeze-stored or maintained at a temperature below room temperature is thawed or cooked by irradiation with a microwave. The invention is still further concerned with a method of storing a food in which a food is packed in a container together with a deoxidizer package and is stored after irradiation with a microwave.

2. Description of the Related Art

Food storage technics making use of deoxidizers have recently been established and have found widespread use in storing a variety of types of foods. The food storage technique making use of a deoxidizer involves packaging a food in a container together with a deoxidizer so as to maintain an anaerobic atmosphere in the container so as to obtain various effects such as prevention of oxidation of fat content of the food, prevention of fading or discoloration of the food, preservation of flavor, protection against noxious insects, prevention of breeding of aerobic bacteria, and so forth, thereby maintaining the quality of the food. The deoxidizer is a composition capable of absorbing oxygen. Usually, the deoxidizer is used as a deoxidizer package in which the deoxidizing compostion is packaged in a small sack made of a gas-permeable material. Among various deoxidizing components which have been proposed and used hitherto, compositions containing powdered iron have been most popular because of advantages such as safety, oxygen absorptivity and cost. On the other hand, the sacks of deoxidizer packages are usually made of a laminate sheet composed of a sheet of paper and a porous polyethylene film bonded together or a laminate sheet composed of a perforated plastic film and a porous polyethylene film bonded together.

Food storage technics relying upon deoxidizers, however, cannot satisfactorily prevent degradation of food which proceeds even in an anaerobic atmosphere, such as deterioration due to actions of bacteria and enzyme and aging of a starch component and so on. Deoxidizers are also ineffective in resisting some types of noxious insects which have small oxygen demands. Namely, 100-percent extermination of such insects by a deoxidizer often requires 9 to 12 days which is much longer than that required when a smoke type insecticide is used.

As a result of the current spreading of household microwave ovens, it has become popular to heat-cook or thaw a food pack by an irradiation with a microwave in microwave ovens. Nowadays, a variety of pre-cooked packed foods are manufactured by food manufacturers and available commercially, so that the demand for heating with microwave irradiation is further increased.

It is also a current tendency that food manufacturers chill or freeze their products before supplying them to markets, for the purpose of stock control and production control, in order to cope with a fluctuation in the demand. It is also a current measure that the food manufacturers freeze-store food packs at temperatures below 0° C. and thaw them by microwave irradiation before shipping. Storage at low temperatures is very effective in preventing degradation of foods due to action of enzymes, as well as in the prevention of aging of starch. Preservation of foods by sterilization, enzyme deactivation and insect killing by microwave irradiation also is a current technic. In this technic, bacteria and insects as dielectric matters are heated and killed by high-frequency induction heating caused as a result of the microwave irradiation. The treatment by irradiation with microwave can be conducted after packing of the foods to be preserved. This method, therefore, has a spreading use because of its advantages such as capability for prevention of secondary contamination, high treating speed and good treating conditions.

Thus, developments have been achieved both in the storage of foods together with deoxidizers and in the utilization of microwave irradiation for the purpose of heating, thawing, cooking, sterilization, enzyme deactivation and insect killing of foods stored at room temperature or in a chilled or frozen state. These developments have given rise to the demands for technics for packing foods together with a deoxidizer package in a container and storing the pack at a room temperature or in a chilled or frozen condition, as well as for technics for microwave irradiation of the food pack containing a deoxidizer package and stored at room temperature or in a chilled or frozen state for the purpose of heating, thawing, cooking, sterilization, enzyme deactivation or insect killing. Preferably, food packs of pre-cooked foods, which are to be heated, thawed or cooked, are charged with deoxidizer packages so that the above-mentioned demand is a matter of a great significance. It is also very important to develop a food storage technic which is capable of obviating the shortcomings of the food storage technic relying upon deoxidizer, such as breeding of facultive and strict anaerobic bacteria, degradation due to enzyme action and long time required for killing insects, as well as shortcomings of microwave irradiation type food storage technic such as ineffectiveness to fading and discoloring, as well as oxidation of oily components.

Irradiation with a microwave, however, causes a problem when applied to a food pack containing a deoxidizer package. Namely, a large proportion of the microwave penetrates the packaging sack material so as to be absorbed by the contents of the deoxidizer package, such as iron powder. In consequence, eddy currents are generated in the contents of the deoxidizer package so that heat is rapidly produced to cause various troubles such as burning of the packaging sack material or rupture of the packaging sack due to a rapid rise of the internal pressure as a result of rapid expansion of vapor produced caused by evaporation of water content of the deoxidizer. In the latter case, the deoxidizer may be scattered in the food pack so as to contaminate the food in the pack.

In order to overcome this problem, a method has been proposed in the specification of Japanese patent application No. 61-221131 in which a conductive material such as a metal foil is used as the packaging sack material so as to prevent the microwave from reaching the contents of the deoxidizer package. This proposal, however, is still unsatisfactory in that electric sparking is generated as a result of eddy currents induced in the packaging sack material so that the sack is broken to allow the contents to be scattered, thus causing the same problem as that described above.

Thus, known deoxidizer packages are not resistant to microwave irradiation so that they could not be used in food packs which are intended for heating, thawing, cooking, sterilization, enzyme deactivation and insect killing by irradiation with a microwave.

SUMMARY OF THE INVENTION

Accordingly, an object of the present invention is to avoid problems such as scattering of content of a deoxidizer package packed together with a food in a food pack when the food pack is subjected, after storage at the room temperature or in a chilled or frozen state, to a microwave irradiation for the purpose of heating, thawing, cooking, sterilization, enzyme deactivation and insect killing, thus ensuring a high degree of safety of such food packs.

In order to achieve this object, the present invention proposes a deoxidizer package in which a deoxidizer mainly composed of iron powder sufficiently diluted by a predetermined filler is packaged in a sack of a material having a controlled gas permeability.

Thus, according to a first aspect of the present invention, there is provided a deoxidizer package for use together with a food to be treated by a microwave irradiation, comprising: a deoxidation composition including (a) iron powder, (b) a metal halide, and (c) a powder filler which has a water-solubility of about zero, a particle size of 60 mesh or finer and a specific surface area of 50 m$^2$/g or less, the powder filler being contained in amount of 100 volume parts or more for 100 volume parts of the iron powder; and a gas permeable packaging material containing the deoxidation composition and having a gas permeability of 1,000 seconds/100 cc or less in terms of Gurley gas permeability.

According to another aspect of the present invention, there is provided a food pack comprising: a food having a water content of 8% or more; a deoxidizer package of the type mentioned above; and a pack container in which the food and the deoxidizer package are hermetically packed and which is made of a material having an oxygen permeability of 200 ml/m$^2$ 24 hr atm or less.

According to still another aspect of the present invention, there is provided a method of freeze-storing and thawing a food, comprising the steps of: placing a food having a water content of 8% or more together with the above-mentioned deoxidizer package in a pack container made of a material having an oxygen permeability of 200 ml/m$^2$ 24 hr atm or less; sealing and freeze-storing the pack container containing the food and the deoxidizer package; and subjecting the container to a microwave irradiation so as to thaw the food.

According to a further aspect of the present invention, there is provided a method of storing and cooking a food, comprising the steps of: placing a food having a water content of 8% or more together with the above-mentioned deoxidizer package in a pack container made of a material having an oxygen permeability of 200 ml/m$^2$ 24 hr atm or less; sealing and storing the pack container containing the food and the deoxidizer package at a temperature of 0° C. or higher but not higher than the room temperature; and subjecting the container to a microwave irradiation so as to cook the food.

According to a still further aspect of the present invention, there is provided a method of storing a food, comprising the steps of: placing a food having a water content of 8% or more and the above-mentioned deoxidizer package in a pack container made of a material having an oxygen permeability of 200 ml/m$^2$ 24 hr atm or less; subjecting the container to a microwave irradiation; and storing the pack container containing the food and deoxidizer package.

In these aspects of the present invention, the deoxidizer package is specifically intended for use together with a food to be irradiated with a microwave, and the food pack also is intended for treatment by microwave irradiation.

The deoxidizer package according to the first aspect of the present invention is characterized as mentioned before by comprising: a deoxidation composition including (a) iron powder, (b) a metal halide, and (c) a powder filler which has a water-solubility of about zero, a particle size of 60 mesh or finer and a specific surface area 50 m$^2$/g or less, the powder filler being contained in amount of 100 volume parts or more for 100 volume parts of the iron powder; and a gas permeable packaging material containing the deoxidation composition and having a gas permeability of 1,000 seconds/100 cc or less in terms of Gurley gas permeability.

Any gas permeable material having a Gurley gas permeability of 1,000 sec/100 cc or less, preferably 100 sec/100 cc or less and more preferably 30 sec/100 cc or less can be used as the material of the sack of the deoxidizer package. When the deoxidizer package is irradiated with a microwave, the water content of the deoxidizer of the package is heated and evaporated. If the gas permeability of the deoxidizer package is too small, e.g., greater than 1,000 sec/100 cc in terms of Gurley gas permeability, the vapor cannot smoothly permeate through the wall of the packaging sack so that the internal vapor pressure of the sack is rapidly increased to cause a rupture of the sack. The gas permeable materials usable as the material of the packaging sack are papers such as Japanese paper, western paper, rayon paper or the like, non-woven cloth made from pulps, cellulose, synthetic fibers or other fibers, plastic films or perforated plastic films, or a laminate of two or more of these materials. The sack material must be prepared such as to meet the requirement for the gas permeability of 1,000 sec/100 cc or less in terms of Gurley gas permeability.

In a preferred form of the packaging sack, the deoxidizer is packaged in a sack (sometimes referred to also as a "gas permeable inner sack") made of a laminate of a paper sheet and a porous polyetylene sheet bonded together and the inner sack in turn is packaged in a sack (sometimes referred to also as a "gas permeable outer sack") made of a porous plastic film such as a porous polyester film. The structure formed by the inner sack and the outer sack will be referred to also as a "double sack structure". Preferably, the double sack structure is so constructed that the inner and outer sacks are not bonded together but an air layer is formed between the walls of both sacks so as to reduce the stiffness of the structure. Such an air layer effectively prevents any exfoliation or delamination at the seal portion of the sacks, as well as permanent deformation of the double sack structure, which may otherwise be caused by the internal vapor pressure generated as a result of the microwave irradiation. It is possible to effect a shield printing on the inner surface of the gas permeable outer sack so as to ensure gas permeability and safety, as well as a good appearance by making the content invisible from the outside of the deoxidizer package.

From the viewpoints of manufacture and use, the plastic film used as the material of the gas permeable outer sack preferably has a large strength. The plastic film suitably used as the material of the gas permeable outer sack is a laminate film including a base layer of polyethylene terephthalate, polyamide, polypropylene, polycarbonate or cellophane and a seal layer of polyethylene (including LLDPE), ionomer, polybutadiene or ethylene-vinyl acetate copolymer. It is also possible to use a film material which is composed of a base layer of polyethylene terephthalate, polyamide, polypropylene, polycarbonate or cellophane and a seal layer of an adhesive such as a hot melt applied to the base layer. For the purpose of attaining a greater resistance of the packaging sack material to damaging force, it is possible to use a reinforcement material such as Warifu (made by Nisseki Goju Seizo K. K.). Among these materials, a laminate film composed of a base film of polyethylene terephthalate or polyamide and a seal layer of polyethylene or ethylene-vinyl acetate copolymer is preferably used because of high strength and ease of manufacture. From the viewpoint of ease of perforation and manufacture, the plastic film has a thickness which preferably ranges between 20 and 150$\mu$, more preferably between 30 and 100$\mu$.

The gas permeable outer sack is formed from a sheet which is prepared by perforating the above-mentioned plastic film so as to impart gas-permeability to the plastic film. Perforation may be conducted by means of a needle having a conical form, a pyramidal form with square or rectangular cross-section, or a cylindrical form with a pointed end. The size of the perforation can be adjusted by selecting the size of the needle or controlling the pressure applied to the needle during the perforation. The shape of the apertures formed by perforation can be made uniform by heating the needle.

Factors such as the number of the apertures per unit area and the size of the apertures can suitably be selected in accordance with the degree of the gas permeability to be attained. For example, when the apertures are formed to have an oval shape, the longer axis of the aperture has a length which generally ranges between 0.02 and 3 mm, preferably between 0.1 and 1 mm, while the number of the apertures is 30 or more, preferably 100 or more and more preferably 300 or more, per 50×50 mm (2500 mm$^2$) of the sack material. The aperture ratio, which is the ratio of the total area of the apertures to the area of the sack material, ranges between 0.1 and 30%, preferably between 1 and 30%. In some cases, the apertures formed by a cold needle are expanded when pressure is applied. In such a case, the aperture ratio in the state where no pressure is applied may be below the range specified above, provided that the aperture ratio after enlargement of the apertures due to application of pressure falls within the above-specified range. A too small aperture ratio causes a risk that the outer sack fails to relieve the internal pressure built up as a result of evaporation of water content due to irradiation with a microwave.

Referring now to the gas permeable inner sack, a material which is heat-sealable at at least one side thereof and which has a gas permeability of 1,000 sec/100 cc or less, preferably 100 sec/100 cc or less and more preferably 30 sec/100 cc or less in terms of Gurley gas permeability is usable as the material of the gas permeable inner sack. For instance, the gas permeable inner sack may be formed from a laminate sheet composed of a base layer of a sheet of paper or a non-woven cloth and a seal layer which is bonded to the base layer and which is made of a porous film of, for example, polyethylene (including LLDPE), ionomer, polybutadiene or ethylene-vinyl acetate copolymer. It is also possible to use, as the material of the gas permeable inner sack, a preforated laminate sheet composed of a base layer of a sheet of paper or a non-woven cloth and a seal layer which is bonded to the base layer and which is made of a film of, for example, polyethylene (including LLDPE), ionomer, polybutadiene or ethylene vinyl acetate copolymer, the laminate sheet being perforated after bonding of the base and seal layers. The number of the pores or apertures, as well as the size, in the porous film or the perforated sheet can suitably be determined in accordance with the degree of the gas permeability to be attained. For instance, the size of the pores or the apertures generally ranges between 0.02 and 3 mm, preferably between 0.5 and 2 mm, while the aperture ratio preferably ranges between 0.1 and 30%. The thickness of the laminate sheet ranges, though not exclusively, between 30 and 300 $\mu$, preferably between 50 and 200 $\mu$, from the viewpoint of ease of handling during manufacture. In order to impart a water-or oil-repellent effect to the laminate sheet, a water-repellent agent or an oil-repellent agent may be applied to the paper or the non-woven cloth which serves as the base layer. If water penetrates into the deoxidizer package, the package tends to be expanded or ruptured due to water evaporation upon microwave irradiation. The paper or non-woven cloth to be used in the package, therefore, has a Stoeckigt Size degree preferably of 10 seconds or more, more preferably of 30 seconds or more. It is also possible to use a reinforcement material such as Warifu, in order to improve resistance to damaging force.

The double sack structure may be constructed such that the gas permeable inner and outer sacks are not bonded but are merely superposed and heat-welded only at their peripheral regions or such that the gas permeable inner sack is simply placed in the gas permeable outer sack.

The iron powder (a) is a powdered metallic iron which is capable of absorbing oxygen by being oxidized. For instance, electrolytic iron powder, reduced iron powder, atomized iron powder, atomized iron alloy powder, or powders prepared by crushing iron articles such as of cast iron, steel or iron alloy, as well as partial oxides of such powders, can be used as the iron powder as the deoxidizer. Obviously, the iron powder can contain permissible amounts of impurities.

The metal halide (b) serves to promote movement of water content of the food into the iron powder when the deoxidizer package is packed together with the food. The metal halide (b) also serves as a catalyst which promotes oxidation of iron powder. Examples of such a metal halide are a chloride of an alkali metal such as sodium chloride, potassium chloride or the like, a chloride of an alkali earth metal such as magnesium chloride, calcium chloride or the like, other types of chloride such as aluminum chloride, ferrous chloride, ferric chloride or the like, a bromide of an alkali metal such as sodium bromide, potassium bromide or the like, a bromide of an alkali earth metal such as magnesium bromide, calcium bromide or the like, other types of bromide such as iron bromide, nickel bromide or the like, an iodide of an alkali metal such as sodium iodide, potassium iodide or the like, an iodide of an alkali earth metal such as magnesium iodide, calcium iodide or the like, and other type of iodide such as iron iodide. From the viewpoint of safety to the human body, as well as sanitation, a metal chloride, particularly sodium chloride, magnesium chloride, calcium chloride, ferrous chloride or ferric chloride, is preferably used.

Too large a quantity of the metal halide causes too large a quantity of water content to be shifted into the deoxidizer composition, with the result that an unfavorable effect is produced during irradiation with microwave. On the other hand, too small a quantity of metal halide results in an insufficient deoxidation effect. The metal halide content, therefore, is selected to range between 0.01 and 20 weight parts, preferably between 0.2 and 5 weight parts, per 100 weight parts of iron powder.

The powder filler (c) is indispensable in order to achieve the advantageous effect of the present invention and, hence, is an essential feature of the present invention. The powder filler is distributed among the iron particles so as to disperse the iron powder. Thus, the powder filler allows the heat generated in the iron powder upon microwave irradiation to rapidly dissipate while preventing any aggregation of iron powder, thereby eliminating establishment of a high temperature in an iron powder aggregate which is a fatal problem in known deoxidizer package making using iron powder.

A substance which has little to no water-solubility is used as the powder filler. In a deoxidizer using iron powder requires water when it absorbs oxygen through oxidation of the iron powder. The water may be contained beforehand in the deoxidizer composition but is usually derived from the object to be preserved, e.g., food. This is the reason why the powder filler must have a small water-solubility or be insoluble to water. If the filler is soluble in water, the filler will be dissolved in water initially contained in the deoxidizer component or derived from the object to be stored, e.g., food, thus failing to achieve the object of the use of the filler, i.e., dispersion and dilution of the iron powder.

The powder filler used in the present invention has a particle size of 60 mesh or finer, preferably 100 mesh or finer. The quantity of the powder filler is 100 volume parts or more, preferably 200 volume parts or more, per 100 volume parts of the iron powder. When the particle size of the powder filler exceeds 60 mesh, dispersion of the iron powder takes place only insufficiently because the iron powder particles are moved into the vacancies among the particles of the powder filler. If the volume parts of the powder filler with respect to the iron powder is below the above-specified range, the particles of the powder filler cannot sufficiently disperse and dilute the iron powder.

The powder filler according to the present invention preferably has a small specific surface area so that the problems attributable to the microwave irradiation can be avoided without impairing the oxygen absorption performance of the deoxidizer component. Thus, the specific surface area of the powder filler is preferably 50 m$^2$/g or less, more preferably 20 m$^2$/g or less. The effect of the powder filler is reduced when the specific surface area exceeds the above-specified range. In addition to the small specific surface area, the powder filler preferably has a small pore volume and low water absorptivity. Thus, a crystalline or glassy material having a small pore volume and water absorptivity is preferably used. Small water absorptivity of the powder filler is preferred because such a small water absorptivity promotes the supply of the water content to the iron powder or other oxygen absorbent so as to ensure a high oxygen absorption speed. The small water absorptivity of the powder filler is also advantageous in that it reduces the total water content of the deoxidizer so as to minimize evaporation and expansion of the water content which is one of the causes of the rupture of the deoxidizer package.

It is quite undesirable that the powder filler generates heat or electric discharge when irradiated with a microwave, because such heat generation and discharge directly lead to burning of the packaging material. From this point of view, the powder filler preferably has an electric resistivity which is $10^6$ (unit $10^{-6}\Omega$ cm) or more, more preferably $10^{10}$ (unit $10^{-6}\Omega$ cm) or more. When the electric resistivity is below $10^6$, a considerably large heat generation will undesirably take place when irradiation with a microwave is conducted.

Examples of the material suitable for use as the powder filler are inorganic materials such as silica, zirconia, alumina silicate, aluminum oxide, alumina, aluminum hydroxide, sodium glass, calcium silicate, calcium carbonate, calcium phosphate, silicon carbide, iron oxide, talc, titanium oxide, peralite, magnesia, boron nitride, aluminum nitride, silicon nitride, carbon nitride, glass, lead glass, strontium titanate, ceramics, bricks, granite, marble, sirasu baloons, gypsum and so forth. Various organic high-molecular compounds also can be used as the material of the powder filler.

Taking into consideration various factors such as the specific surface area, volume of pores, water absorptivity and so forth, silica, aluminum oxide, alumina, sodium glass, calcium carbonate, calcium phosphate, silicon carbide, iron oxide, talc, titanium oxide and peralite are used most suitably.

These filler materials may be used independently or in the form of a mixture of two or more of these materials.

The content of the deoxidizer package, i.e., the deoxidizer composition, is prepared by sufficiently and uniformly mixing the three components: namely, (a) iron powder, (b) metal halide and (c) powder filler. The mixing may be conducted by a simple blending, though other suitable method may be used provided that such method ensures that the iron powder, metal halide and the powder filler form a uniform mixture. For instance, considering that the whole of the metal halide efficiently and uniformly contact the iron powder, the metal halide may be added in the form of a coating on the particles of the iron powder. Alternately, the iron powder particles may be coated with the powder filler so that the iron powder particles may be dispersed uniformly. The coating with the metal halide or with the powder filler may be conducted by an ordinary coating method.

In the deoxidizer composition used in the present invention, the water content in the compsition is evaporated to become vapor so as to establish a high internal pressure in the deoxidizer package, causing a risk for the package to be ruptured. The water content of the composition, therefore, is peferably small, e.g., 5% or less, though this value is not exclusive.

In order to promote the uniform mixing of components of the deoxidizer composition, as well as for achieving various other advantages, it is possible to add various additives and/or assistants to the deoxidizer composition. For instance, a deodorant or a smell extinguisher such as activated carbon may be added. Such an agent removes not only unpleasant smell due to mold formation which takes place even at the room temperature but also offensive smell which is generated from the packaging material or the packed contents at high temperatures, generated as a result of a microwave irradiation. Such additives or assistants can be used to the extent that they do not substantially deteriorate the anti-microwave characteristics of the deoxidizer composition, and therefore, the amount of such additives or assistants is preferably of 5% or less of the total weight of the deoxidizer composition.

The deoxidizer package according to the present invention can be obtained by packaging the above-described deoxidizer composition in a packaging material which has a gas permeability of 1,000 seconds/100 cc or less in terms of Gurley gas permeability.

The container used in the food pack of the present invention is made of a material which has an oxygen permeability of 200 ml/m$^2$ 24 hr atm or less, preferably 100 ml/m$^2$ 24 hr atm or less. The container can have any desired shape provided that it can hermetically contain the content. The simplest form of the container used as the container of the food pack of the present invention is a sack made from various polyvinylidene chloride coat laminate films such as KON/PE(polyvinylidene chloride coat nylon/polyethylene), KOP/PE (polyvinylidene chloride coat polyprolylene/polyethylene) or KPET/PE (polyvinylidene chloride coat polyethylene terephthalate/polyethylene) and so forth, as well as other commecially available laminate plastic film such as EVAL manufatured and sold by Kuraray Co., Ltd. Normally, sealing is effected by a heat-sealing method.

Materials which produce any microwave shielding effect, such as an aluminum evaporated film and laminate film with aluminum foil should not be used as the material of the container. This is because such a material prevents the microwave from reaching the food contained in the container at the room temperature or in a chilled or frozen state, so as to hamper heating, thawing and cooking of such a content.

In order to improve the efficiency of treatment executed by microwave irradiation for the purpose of heating, thawing, cooking, sterilization, enzyme deactivation, insecticide and so forth, the food preferably has a water content which is 8% or more.

Examples of the food which can be packed in the food pack according to the invention are: cereals such as rice, wheat, bean or kurosoba; processed meat products such as fried foods, e.g., grilled chicken, hamburger, nugget, croquette, American hot dog, cutlet or the like, as well as ham and sausage; processed aquatic products such as grilled fish, fried fish, steamed fishery Products or the like, as well as pasted fish meats such as those known as kamaboko and chikuwa; steamed products such as meat-stuffed dumpling and shao-mai; Japanese sweets such as manju, dorayaki, sao-gashi, kuzumochi, daifuku, abekawa-mochi, ama-natto or the like, western sweets such as cake, chou a la creme, sponge cake, baum cuhen, pancake or the like; processed rice and wheat foods such as rice cooked with red beans, Chinese fried rice, mazegohan or the like; noodles such as boiled udon, boiled soba, unboiled soba, unboiled udon, yakisoba, spaghetti, yakiudon or the like; various tasty products; sea weeds such as tangle and wakame sea weed; daily dishes; and various other miscellaneous foods including soybean curd, natto, meat, fish meat, soybean paste, kirimochi and so forth, as well as retort foods of the above-mentioned food products. Various other foods which can effectively be preserved together with deoxidizer at the room temperature or in a chilled or frozen state, for the purpose of heating, thawing, cooking, sterilization, enzyme deactivation and insect killing, are also usable as the food in the food pack according to the present invention.

Freeze-storing method, thawing method, storage method, heating method and cooking method of the invention are particularly effective when used for fried foods, steamed foods, rice and wheat products, noodles, meats and fish meats, processed meats and processed fish meats, and Japanese sweets.

Irradiation with a microwave, executed together with deoxidation by the deoxidizer for the purpose of sterilization, insect killing and enzyme deactivation is effective particularly when the food of the food pack of the invention is a Japanese sweet, western sweet, noodle, kirimochi, soybean paste, fried food, steamed food, processed rice or wheat product or a cereal.

Low-temperature storage, e.g., storage in a chilled or frozen state, is effective in preventing degradation of food attributable to bacteria or enzyme action, as well as in preventing aging of starch, thus compensating for shortcomings of the storage technic relying upon a deoxidizer. Thus, the combination with such a low-temperature storage technic and the storage technic making use of a deoxidizer produces a remarkable effect and, hence, is very important.

Examples of the methods of the invention for freeze-storing, thawing, storing and cooking foods, making use of the deoxidizer package or the packed food of the invention, as well as storage method of the present invention, will be described hereinafter.

(1) One of the foods mentioned above and the deoxidizer package explained before are packed in a container made from a material having an oxygen permeability of 200 ml/m$^2$ 24 hr atm or less. The container is completely sealed and freeze-stored. The frozen food pack is irradiated with a microwave so as to be heated and thawed when the food pack is shipped from the food manufacturer, or at a suitable stage of the distribution or sales channel. Alternatively, the frozen food pack is heated and thawed by irradiation with a microwave in a purchaser's household microwave oven.

The term "freeze-storage" is used to mean storage at a temperature below 0° C. The freezing is effected by a method which is ordinarily used in freezing conventional packed foods. For instance, it is possible to pack and seal a frozen food in a container together with a deoxidizer package. Usually, however, the freezing is executed after packing the food and the deoxidizer package in the container.

The food thus heated and thawed may be cooked by a further microwave irradiation. In particular, pre-cooked foods are in most cases thawed and further heated in a household microwave oven so as to become ready for service on a table.

Thus, the freeze-storage and thawing methods of the invention are particularly advantageous when applied to a food pack of a pre-cooked food.

(2) One of the foods mentioned above and the above-explained deoxidizer package are packed in a container made from a material having an oxygen permeability of 200 ml/m² 24 hr atm or less. The container is then hermetically sealed and stored at the room temperature or in a chilled state. After the storage, a microwave is applied to the pack for the purpose of heat-cooking so that the food becomes ready for service. The irradiation with the microwave for the heating or cooking purpose may be executed in one of the following stages:

(1) at the time of shipping from the food manufacturer (heating and cooking conducted by the food manufacturer);

(2) at an intermediate stage during distribution or sales before sold to purchaser (heating and cooking conducted by a dealer or a seller); and (3) immediately before the service (heating and cooking conducted by purchaser with a household microwave oven).

In particular, most pre-cooked foods are intended for service through heating and cooking by a household microwave oven, so that the storage method and cooking method of the present invention can be used effectively.

The term "storage at room temperature" and "storage in chilled state" are used to mean to store the food pack at the room temperature and to store the food pack at a temperature which is below the room temperature, typically 0° C. or more and 12° C. or less. The concept of the storage at room temperature and storage in chilled state should be understood to include also such a case that the food pack, which was initially freeze-stored (stored at 0° C. or below) in the stage of manufacture and distribution, is stored in a chilled state or at room temperature after a certain stage in the distribution or sales.

(3) One of the foods mentioned before and the deoxidizer package described before are charged into a container made of a material having an oxygen permeability of 200 ml/m² 24 hr atm or less, and the thus formed food pack is irradiated with a microwave for a predetermined period which ranges between 10 seconds and 10 minutes. The irradiation may be executed after hermetically sealing the container or may be conducted while the container is still open. When the microwave irradiation is applied after sealing the container, it is not allowed to apply the microwave for a long time because the container expands due to evaporation of water content of the food. If such a short irradiation cannot produce sufficeint heating effect, it is possioble to apply the microwave for a longer time while keeping the container open.

(EXAMPLES)

Example 1

(Preparation of Deoxidizer Package and Test of Performance of the Deoxidizer Package)

100 g of pure iron powder was mixed with 5 g of 10% aqueous solution of sodium chloride and the mixture was dried so that sodium-chloride-coated iron powder having a bulk specific gravity of 2.5 g/cc, uniformly coated with sodium chloride, was obtained.

1.0 g of this sodium-chloride-coated iron powder was mixed with 2.0 g of α-alumina having a particle size 100 mesh or less, a specific surface area of 2.0 m²/g and a bulk specific gravity of 0.8 g/cc. Meanwhile, a double sack structure was prepared by covering a gas permeable inner sack made of a laminate material composed of a Japanese paper and a porous polyethylene film bonded together with a gas permeable outer sack which is made from a laminate material composed of a polyester film and a polyethylene film bonded together and then perforated. The thus formed double sack structure as the packaging material had a Gurley gas permeability of 15 seconds/100 cc. The above-mentioned mixture was placed in the gas permeable inner sack of the double sack structure, thus forming a deoxidizer package of 50×50 mm.

The deoxidizer package thus prepared was packed and sealed together with 500 cc of air and a slice of bread in a sack of KON/PE of 70μ thick and the pack was stored at 5° C. Oxygen concentration in the pack was measured for every 10 hours. After elapse of 48 hours from the start of storage, the pack was placed in a refrigerator in which a cold atmosphere of −20° C. was maintained. Then, 7 days thereafter, the pack was placed in a microwave oven (manufactured by Mitsubishi Electric Corp, operating frequency 2450±50 MHz, output 500 W) and was subjected to irradiation with a microwave conducted for 5 minutes. Meanwhile, the appearance of the deoxidizer package was observed.

The results of the test are shown in Table 1.

Comparison Example 1

Test and observation were conducted under the same conditions as Example 1, except that for the packaging material having the Gurley gas permeability of 15 seconds/100 cc used in Example 1 was substituted a material which is formed by laminating a sterilized paper and a polyethylene film and which had a Gurley gas permeability of 4,000 seconds/100 cc. The results are also shown in Table 1.

Comparison Example 2

Test and observation were conducted under the same conditions as Example 1, except that the deoxidizer composition contained 1.0 g of sodium-chloride-coated iron powder, without α-alimina. The results are also shown in Table 1.

Comparison Example 3

Test and observation were conducted under the same conditions as Example 1, except that the quantity of α-alumina was changed to 0.3 g. The results are also shown in Table 1.

TABLE 1

| | 10 hrs after | 20 hrs after | 30 hrs after | 40 hrs after | Appearance of deoxidizer package upon irradiation with microwave (after 7-day freeze storage) |
|---|---|---|---|---|---|
| Example 1 | 11.2 | 1.4 | 0.1 or less | 0.1 or less | No abnormality found in 5 minutes after microwave irradiation |
| Comparison Example 1 | 14.6 | 7,2 | 2.6 | 0.9 | Packaging material ruptured 30 seconds after irradiation to allow scatter of content |
| Comparison Example 2 | 11.6 | 1.8 | 0.1 or less | 0.1 or less | Flame generated in 30 seconds after irradiation and packaging material burnt |
| Comparison Example 3 | 11.5 | 1.6 | 0.1 or less | 0.1 or less | Flame generated in 1 minutes after irradiation and packaging material burnt |

Example 2

(Thawing of Manju (Bun with Bean-Jam Filler) with Microwave)

A deoxidizer package was formed in the same manner as Example 1. The deoxidizer package was placed and heat-sealed in a sack made from KON (15μ thick)-/PE(70μ thick) laminate sheet and having a width of 200 m and a length of 220 mm, together with 6 pieces of onsen (hot-spring) manju packaged in a box and having a weight of about 170 g. The sack also contained 260 ml of air. The sack as the packing container containing the deoxidizer package and manju was left for 1 day at the room temperature and was then stored in a refrigerator at −20° C. Then, five days thereafter, the container was taken out of the refrigerator and a microwave was applied to the pack so as to thaw the contents. The microwave irradiation was conducted for 2 minutes with a tunnel-type device designed for business use. During the irradiation, the state of change in the appearance of the deoxidizer package and the state of progress of thawing were observed. After the thawing, the pack was stored at 25° C. for 10 days and then the appearance of the manju was checked. The results are shown in Table 2.

Comparison Example 4

A deoxidizer package was formed in the same manner as Comparison Example 2, and a test was conducted under the same conditions as Example 2 except that this deoxidizer was used. The results are also shown in Table 2.

Comparison Example 5

Test was conducted under the same conditions as Example 2 except that the deoxidizer package was omitted. The results are shown in Table 2.

TABLE 2

| | Microwave irradiation | | |
|---|---|---|---|
| | Appearance of deoxidizer package | Appearance of Onsen Manju | 10 days after thawing |
| Example 1 | No abnormality found | Thawed (Manju temperature 35° C.) | No generation of mildew found |
| Comparison Example 4 | Packaging material scorched and content mixed in Manju | Thawed (Manju temperature 35° C.) | No generation of mildew found |
| Comparison Example 5 | — | Thawed (Manju temperature 35° C.) | Mildew generation found |

Example 3

(Heat/Cooking of Gomoku-Okowa (rice boiled with red beans and chopped vegetables) with Microwave Irradiation)

A deoxidizer package was prepared in the same manner as Example 1. The thus prepared deoxidizer package was packed and heat-sealed in a sack of KON(15μ thick)/PE(70μ thick) laminate layer, having a width of 200 mm and a length of 220 mm, together with 180 g of commercially available gomoku-okowa. The volume of the air in the pack was 250 ml. The pack thus prepared was shelved for 30 days in a display case and was cooked with a microwave oven (output 500 W, produced by Mitsubishi Electric Corp.), thereby testing the state of the gomoku-okowa during the shelving while observing any change in the appearance of the deoxidizer package caused by the microwave irradiation and the state of cooking with the electronic range.

The results are shown in Table 3.

Comparison Example 6

A deoxidizer package was prepared in the same manner as that in Comparison Example 2. A test was conducted under the same conditions as Example 3, except that this deoxidizer package was used. The results are shown in Table 3.

Comparison Example 7

A test was conducted under the same conditions as Example 3, except that the deoxidizer package was omitted. The results are shown in Table 3.

TABLE 3

| Type of deoxidizer package | | Example 3 Package of Example 1 | Comp. Ex. 6 Package of Comp. Ex. 2 | Comp. Ex. 7 No package used |
|---|---|---|---|---|
| Oxygen concentration during storage (1) | 7 days after | 0.01 or less | 0.01 or less | 19.0 |
| | 30 days after | 0.01 or less | 0.01 or less | 1.3 |
| State of generation of mildew after 30 days storage | | No mildew generation | No mildew generation | Mildew over wide area |
| Appearance of deoxidizer package after microwave irradiation | 60 second irradiation | No abnormality found | Package scorched and content leaked | — |
| | 120 second irradiation | No abnormality found | Package scorched and content leaked | — |
| | 180 second irradiation | No abnormality found | Package scorched and content leaked | — |
| Temp of Gomoku Okowa after 180 second microwave irradiation | | 85–95° C. | 85–95° C. | 85–95° C. |
| Taste of Gomoku Okowa after 180 | | | | |

TABLE 3-continued

| Type of deoxidizer package | Example 3 Package of Example 1 | Comp. Ex. 6 Package of Comp. Ex. 2 | Comp. Ex. 7 No package used |
|---|---|---|---|
| second microwave irradiation (2) | | | |

(1) Oxygen concentration during storage: Oxygen concentration in stored KON/PE sack (Unit %)
(2) Taste of Gomoku-Okowa after 180 second microwave irradiation
A ... Good taste
B ... Not edible due to burnt taste
C ... Not edible due to offensive smell of rottenness

Example 4

(Sterilization of Unboiled Udon (Japanese Noodles) with Microwave Irradiation)

A deoxidizer package was formed in the same manner as Example 1. Meanwhile, udon was prepared by forming a mixture of 100 parts of wheat, 20 parts of water and 2 parts of salt, and adding to the mixture water such that the mixture has a water content of 31%. 100 g of the thus prepared udon was placed together with the deoxidizing agent in a sack (150 mm wide and 150 mm long) made of KON(15μ thick)/PE(70μ thick) laminate sheet. The sack as the pack container was sealed with 200 ml of air confined therein. The pack thus prepared was then subjected to a microwave irradiation effected for 40 seconds by a microwave oven (output 500 W) produced by Mitsubishi Electric Corp. The pack was then shelved for several days at 25° C. and then a functional test was executed to examine the state of the shelved unboiled udon. The results are shown in Table 4.

Comparison Example 8

A deoxidizer package was prepared in the same manner as Comparison Example 1. A treatment and a test were executed under the same conditions as Example 4, except that the above-mentioned deoxidizer package was used. The results are also shown in Table 4.

Comparison Example 9

A test was conducted under the same conditions as Comparison Example 8, except that the microwave irradiation was omitted. The results are also shown in Table 4.

Comparison Example 10

A deoxidizer package was prepared in the same manner as that in Comparison Example 2. A treatment and a test were carried out under the same conditions as Example 4, except that the above-mentioned deoxidizer package was used. The results are also shown in Table 4.

Comparison Example 11

A test was conducted under the same conditions as Comparison Example 10, except that the microwave irradiation was omitted. The results are also shown in Table 4.

Comparison Example 12

A deoxidizer package was prepared in the same manner as Comparison Example 3. A treatment and a test were carried out under the same conditions as Example 4 except that the above-mentioned deoxidizer package was used. The results are also shown in Table 4.

Comparison Example 13

A test was executed under the same conditions as Comparison Example 12 except that the microwave irradiation was omitted.

Comparison Example 14

A treatment and a test were executed under the same conditions as Example 4, except that the deoxidizer package was omitted. The results are also shown in Table 4.

Comparison Example 15

A test was executed under the same conditions as Comparison Example 14 except that the microwave irradiation was omitted. The results are also shown in Table 4.

Comparison Example 16

A test was executed under the same conditions as Example 4 except that the microwave irradiation was omitted. The results are also shown in Table 4.

TABLE 4

| | Type of Deoxidizer Package | 40 second microwave irradiation | Appearance of Package after irradiation | Results of sensory test after storage at 25° C. | | | |
|---|---|---|---|---|---|---|---|
| | | | | 3 days | 5 days | 7 days | 14 days |
| Example 4 | A | Done | | − | − | − | − |
| Comp Ex. 8 | B | Done | X | − | + | ++ | |
| Comp Ex. 9 | B | Not done | | − | ++ | | |
| Comp Ex. 10 | C | Done | X | − | + | ++ | |
| Comp Ex. 11 | C | Not done | | − | ++ | | |
| Comp Ex. 12 | D | Done | Δ | − | − | + | ++ |
| Comp Ex. 13 | D | Not done | | − | ++ | | |
| Comp Ex. 14 | Not used | Done | | − | ++ | | |
| Comp Ex. 15 | Not used | Not done | | ++ | | | |
| Comp Ex. 16 | A | Not done | | − | ++ | | |

(1) Type of deoxidizer package A: Package of Example 1 B: Package of Comparison Example 1 C: Package of Comparison Example 2 D: Package of Comparison Example 3
(2) Appearance of Deoxidizer package after irradiation : No abnormality found Δ: Package scorched with burnt smell X: Package ruptured or burnt down to allow content to scatter
(3) Result of Sensory Test −: Good +: Slight fermentation smell ++: Strong fermentation smell As will be clearly understood from Table 4, when the deoxidizer package of Example 1 was used, an offensive smell due to fermentation was produced in a short period of 5 days in the cases where the microwave irradiation was omitted, despite the use of the deoxidizer package. In contrast, the sample which has undergone the 40-second microwave irradiation was kept in good condition even after 14-day shelving, thus providing the remarkable effect of the microwave irradiation.

Referring specifically to Comparison Example 10 which utilizes a conventional deoxidizer package, the deoxidizer exhibited a rapid generation of heat in response to the microwave irradiation, with the result that the packaging material was burnt allowing the contents of the deoxidizer package to be scattered into the udon in the pack.

Rupture and scorch of the packaging material of the deoxidizer package were observed in the cases where the deoxidizer packages of Comparison Examples 1 and 3 were used. In contrast, no abnormality was found in the cases where the deoxidizer package of the invention was used, thus proving the fact that the microwave irradiation can safely be carried out when the deoxidizer package of the present invention is used.

As will be understood from the foregoing description, the present invention offers the following advantages.

Firstly, the invention provides a deoxidizer package which can suitably be packed in a pack container together with an object to be heated or sterilized, e.g., a food, and which can withstand any microwave irradiation applied to the pack. Thus, the deoxidizer package can maintain its oxygen absorbing performance even when irradiated with a microwave, and is completely free from the problems encountered with known deoxidizer packages of the kind described, such as rupture or burning of the deoxidizer packaging material attributable to a rapid establishment of high temperature as a result of the microwave irradiation on the deoxidizer, thus avoiding an accident such as scattering of the deoxidizer into the contents of the pack, such as the food.

The food pack of the present invention in which a food is packed in a pack container together with the deoxidizer package of the present invention can prevent any secondary contamination of the food and is capable of avoiding rapid heating of the deoxidizer composition even when the food pack is irradiated with a microwave, thus eliminating problems such as scattering of the deoxidizer composition into the food of the pack which may otherwise be caused by a rupture or burning of the packaging material due to a rapid rise of internal pressure or temperature of the deoxidizer package caused by the microwave irradiation. Thus, the food pack according to the invention offers a great advantage from the viewpoint of safety of foods.

The food pack of the present invention includes a food having a water content not smaller than 8% and hermetically sealed in a pack together with a specific deoxidizer package. It is therefore possible to prevent any degradation such as fading and discoloration, oxidation of fat content and so forth, while preserving initial flavor of the food, during long storage at the room temperature or in a chilled or frozen state. The purchaser who has purchased the frozen food pack of the present invention can heat, thaw and cook the food simply by placing the food pack in a household microwave oven and operating the range so as to effect a microwave irradiation on the food pack. In addition, the thawed food can be heat-cooked by a further irradiation with the microwave.

The food manufacturers, dealers and sellers can have a greater degree of freedom in conducting the controls of production and stock by suitably storing the food pack at room temperature or in a chilled or frozen state so as to avoid degradation due to the action of enzymes in the food and aging of starch in the food. Shipping of the food pack from a factory or delivery to purchasers can be conducted without difficulty by conducting, as necessitated, a microwave irradiation for the purpose of heating, thawing, cooking or temperature control. In addition, the deoxidizer package of the invention in the food pack of the invention can maintain its deoxidation effect even after a food pack which has been frozen is heated and thawed.

It is also to be noted that, according to the present invention, a food having a water content of 8% or more is subjected to a microwave irradiation for the purpose of sterilization, insect killing, deactivation of enzyme, and so forth. Thereafter, good condition of the food is maintained by virtue of the deoxidizer package which effectively prevents fading and discoloration, oxidation of fat content and breeding of aerobic bacteria while preserving the initial flavor of the food.

What is claimed is:

1. A method of freeze-storing and thawing a food, comprising the steps of:

placing a food having a water content of 8% or more and a deoxidizer package in a pack container made of a material having an oxygen permeability of 200 ml/m$^2$ 24 hr atm or less, said deoxidizer package including a deoxidation composition containing iron powder, a metal halide, and a material to dissipate heat generated in said iron powder upon irradiation with microwaves comprising a powder filler having a water solubility of about zero, a particle size of 60 mesh or finer and a specific surface area of 50 m$^2$/g or less, said powder filler being contained in amount of 100 volume parts or more for 100 volume parts of said iron powder, said deoxidizer package further including a gas permeable packaging material containing said deoxidation composition and having a gas permeability of 1,000 seconds/100 cc or less in terms of Gurley gas permeability;

sealing and freeze-storing said pack container containing said food and said deoxidizer package; and subjecting said container to a microwave irradiation so as to thaw said food.

2. A method of storing and cooking a food, comprising the steps of:

placing a food having a water content of 8% or more and a deoxidizer package in a pack container made of a material having an oxygen permeability of 200 ml/m$^2$ 24 hr atm or less, said deoxidizer package including a deoxidation composition containing iron powder, a metal halide, and a material to dissipate heat generated in said iron powder upon irradiation with microwaves comprising a powder filler having a water solubility of about zero, a particle size of 60 mesh or finer and a specific surface area of 50 m$^2$/g or less, said powder filler being contained in amount of 100 volume parts or more for 100 volume parts of said iron powder, said deoxidizer package further including a gas permeable packaging material containing said deoxidation composition and having a gas permeability of 1,000 seconds/100 cc or less in terms of Gurley gas permeability;

sealing and storing said pack container containing said food and said deoxidizer package at a temperature of between about 0° C. to about 12° C.; and subjecting said container to a microwave irradiation so as to cook said food.

3. A method of storing a food, comprising the steps of:

placing a food having a water content of 8% or more and a deoxidizer package in a pack container made of a material having an oxygen permeability of 200 ml/m$^2$ 24 hr atm or less, said deoxidizer package including a deoxidation composition containing iron powder, a metal halide, and a material to dissipate heat generated in said iron powder upon irradiation with microwaves comprising a powder filler having a water solubility of about zero, a particle size of 60 mesh or finer and a specific surface area of 50 m$^2$/g or less, said powder filler being contained in amount of 100 volume parts or more for 100 volume parts of said iron powder, said deoxidizer package further including a gas permeable packaging material containing said deoxidation composition and having a gas permeability of 1,000 seconds/100 cc or less in terms of Gurley gas permeability;

subjecting said container to a microwave irradiation; and storing said pack container containing said food and deoxidizer package.

4. A method of freeze-storing and thawing a food according to claim 1 wherein said deoxidation composition comprises a uniform mixture of iron powder, metal halide and powder filler.--.

5. A method of storing and cooking a food according to claim 2 wherein said deoxidation composition comprises a uniform mixture of iron powder, metal halide and powder filler.

6. A method of storing a food according to claim 3 wherein said deoxidation composition comprises a uniform mixture of iron powder, metal halide and powder filler.

* * * * *

UNITED STATES PATENT AND TRADEMARK OFFICE
CERTIFICATE OF CORRECTION

PATENT NO. : 4,996,068

DATED : February 26, 1991

INVENTOR(S) : Hatakeyama et al.

It is certified that error appears in the above-identified patent and that said Letters Patent is hereby corrected as shown below:

On the title page:
In the Abstract, line 3, change "poweder" to --powder--.

In item [56] References Cited, change "63-082967 9/1986 Japan" to --63-82967 4/1988 Japan--.

Signed and Sealed this

Third Day of November, 1992

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO. : 4,996,068

DATED : February 26, 1991

INVENTOR(S) : Hatakeyama et al.

It is certified that error appears in the above-identified patent and that said Letters Patent is hereby corrected as shown below:

ON THE TITLE PAGE:

In item no. [30], Foreign Application Priority Data,
--Sept. 26, 1988 [JP] Japan................63-238919--
was omitted on patent.

Signed and Sealed this

Thirty-first Day of August, 1993

*Attest:*

BRUCE LEHMAN

*Attesting Officer*     Commissioner of Patents and Trademarks